United States Patent
Coker et al.

(10) Patent No.: US 8,510,504 B2
(45) Date of Patent: Aug. 13, 2013

(54) SMR STORAGE DEVICE WITH USER CONTROLS AND ACCESS TO STATUS INFORMATION AND PARAMETER SETTINGS

(75) Inventors: Jonathan Darrel Coker, Rochester, MN (US); David Robison Hall, Rochester, MN (US)

(73) Assignee: HGST Netherlands B.V., Amsterdam (NL)

( * ) Notice: Subject to any disclaimer, the term of this patent is extended or adjusted under 35 U.S.C. 154(b) by 148 days.

(21) Appl. No.: 13/200,458

(22) Filed: Sep. 22, 2011

(65) Prior Publication Data

US 2012/0303889 A1  Nov. 29, 2012

Related U.S. Application Data

(60) Provisional application No. 61/489,174, filed on May 23, 2011.

(51) Int. Cl.
*G06F 12/00* (2006.01)

(52) U.S. Cl.
USPC ............ 711/112; 711/113; 711/170; 711/173

(58) Field of Classification Search
None
See application file for complete search history.

(56) References Cited

U.S. PATENT DOCUMENTS

| | | | |
|---|---|---|---|
| 6,185,063 B1 | 2/2001 | Cameron | |
| 6,378,037 B1 | 4/2002 | Hall | |
| 6,967,810 B2 * | 11/2005 | Kasiraj et al. | 360/78.04 |
| 7,603,530 B1 | 10/2009 | Liikanen et al. | |
| 2005/0071537 A1 | 3/2005 | New et al. | |
| 2007/0183071 A1 | 8/2007 | Uemura et al. | |
| 2010/0205623 A1 | 8/2010 | Molaro et al. | |
| 2010/0232057 A1 | 9/2010 | Sanvido et al. | |

OTHER PUBLICATIONS

Ikuya Tagawa, et al.; Minimization of erase-band in shingled PMR with asymmetric writer; Journal of Magnetism and Magnetic Materials; No vol. or page given; online Dec. 2, 2010 in ScienceDirect; 3 pages.

Yuval Cassuto, et al.; Indirection Systems for Shingled-Recording Disk Drives; 26th IEEE (MSST2010) Symposium on Massive Storage Systems and Technologies; 44 pages; May 7, 2010. http://storageconference.org/2010/Presentations/Research/15.Cassuto.pdf.

Ahmed Amer, et al.; Design Issues for a Shingled Write Disk System; 26th IEEE (MSST 2010) Symposium on Massive Storage Systems and Technologies: Research Track; 12 pages; May 7, 2010. http://storageconference.org/2010/Papers/MSST/Amer.pdf.

* cited by examiner

*Primary Examiner* — Shawn X Gu
(74) *Attorney, Agent, or Firm* — G. Marlin Knight

(57) ABSTRACT

Shingled magnetic recording (SMR) devices are described that include a command processor for accepting commands from the host/user for executing selected SMR related operations, setting selected SMR parameters and reading selected SMR related statistics and status indicators. The commands allow a host/user to control defragmentation and destaging operations. Embodiments include some or all of the set of features allowing selection of formatting settings, selection of optimization settings; command to immediately run defragmentation operation; command to change waiting time before starting defragmentation operation; and command to temporarily suspend defragmentation operation until certain usage threshold is met (e.g., E-region(s) near full).

20 Claims, 1 Drawing Sheet

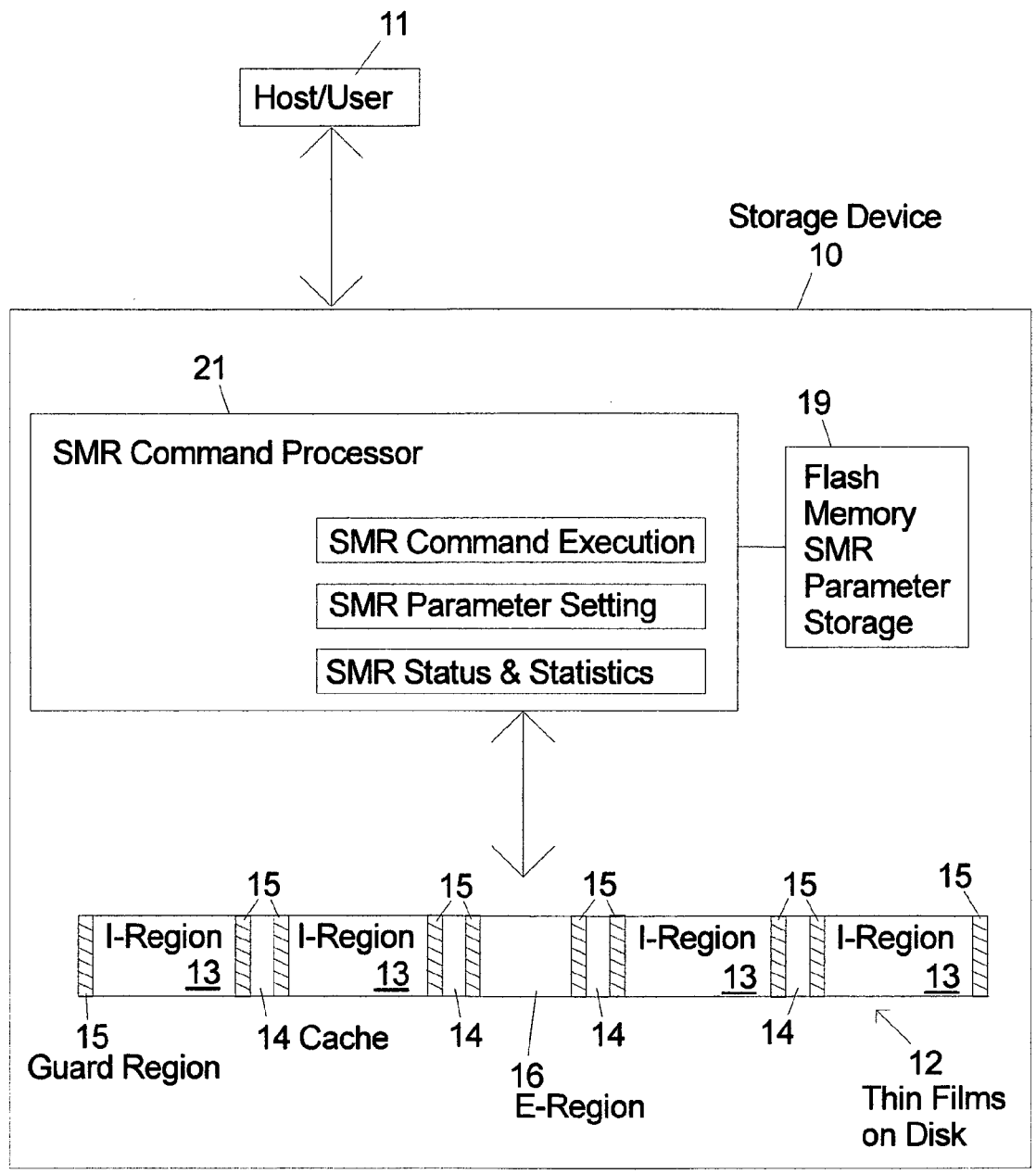

SMR STORAGE DEVICE WITH USER CONTROLS AND ACCESS TO STATUS INFORMATION AND PARAMETER SETTINGS

RELATED APPLICATIONS

This application is related to commonly assigned provision patent application filed on May 23, 2011 bearing Ser. No. is 61/489,174 and the benefits of this provisional application are claimed under 35 U.S.C. 119(e).

A commonly assigned patent application filed on Jul. 18, 2011 bearing Ser. No. 13/135,953, which is hereby incorporated by reference, describes SMR drive embodiments with write-twice cache regions that are mentioned in the present application.

FIELD OF THE INVENTION

The invention relates to the field of data storage device architecture for shingle-written magnetic recording (SMR) including selection of host/user commands and parameters available for host/user reading and setting.

BACKGROUND

Conventional disk drives with magnetic media organize data in concentric tracks. The concept of shingled writing is a form of perpendicular magnetic recording and has been proposed as a way of increasing the areal density of magnetic recording. In shingle-written magnetic recording (SMR) media a region (band) of adjacent tracks are written so as to overlap one or more previously written tracks. Unlike conventional tracks, which can be written in any order, the shingled tracks must be written in sequence. The tracks on an SMR disk surface are organized into a plurality of shingled regions (typically called I-regions) which can be written sequentially from an inner diameter (ID) to an outer diameter (OD) or from OD to ID. The number of tracks shingled together in a region is a key performance parameter of shingled-writing. Once written in shingled structure, an individual track cannot be updated in place, because that would overwrite and, thereby, destroy the data in overlapping tracks. Shingle-written data track regions, therefore, from the user's viewpoint are sometimes thought of as append-only logs. To improve the performance of SMR drives, a portion of the media is allocated to a so-called "exception region" (E-region) which is used as staging area for data which will ultimately be written to an I-region. After an I-region is written, updates or deletes to LBAs in the region cannot be written directly, so the old data becomes a virtual hole in the region which is subject to being defragmented to remove the virtual holes and make room for more exceptions in the E-region. The indirection controller hardware and firmware execute this process.

Because a portion of the previously written track is overwritten during writing of the adjacent track, SMR heads write a wider path than the final actual track width. Therefore, most of the write path is erased when the overlapping track is subsequently written. These unique aspects of SMR have led to the development of special write heads for SMR.

Address indirection in the shingle-written storage device's internal architecture is useful to emulate existing host interfaces at least to some extent and shield the host from the complexities associated with SMR. Conventionally host file systems use logical block addresses (LBAs) in commands to read and write blocks of data without regard for actual locations (physical block address (PBA)) used internally by the storage device. Hard disk drives have had some level of LBA-PBA indirection for decades that, among other things, allows bad sectors on the disk to be remapped to good sectors that have been reserved for this purpose. Address indirection is typically implemented in the controller portion of the drive's architecture. The controller translates the LBAs in host commands to an internal physical address, or something closer to a physical address.

The conventional LBA-PBA mapping for defects does not need to be changed often. In contrast, in an SMR device the physical block address (PBA) of a logical block address (LBA) can change depending on write-history. For example, background processes such as garbage collection move data sectors from one PBA to another but the LBA stays the same. The indirection system for SMR is a natively dynamic system in which the controller translates host address requests to physical locations. In an SMR system, the LBA-PBA mapping changes with every write operation because the system dynamically determines the physical location on the media where the host data for an LBA will be written. The same LBA will be written to a different location the next time the host LBA is updated. The indirection system provides a dynamic translation layer between host LBAs and the current physical locations on the media.

The architecture of an a SMR drive has complexities that were not present in prior art HDDs, that can include on-disk caching, shingled and unshingled regions, address indirection systems, and defragmentation/reconstitution algorithms. This architecture also has a set of parameters and status/statistical information that are different from those of a conventional HDD. Optimization of these parameters presents a new problem to SMR designers. A certain level optimization can be achieved with the help of experimental data in the design stage and at the manufacturing site, but this optimization is based on certain assumptions of the anticipated workloads and customer preferences that may turn out not to be appropriate for some users and/or applications. Therefore, there is a need to provide for users with performance data and the ability to change parameters for SMR devices in the field. In some cases power or heat restrictions, for example, might require specific parameters changes. Flexibility in setting of parameters allows users to manage their SMR HDD resources. In addition making status/statistical information kept in individual SMR HDDs available allows customers to determine the source/problem causing certain performance issues.

For some applications there are advantages in minimizing the difference in performance between standard HDDs and SMR HDDs; however, SMR HDDs have certain advantages over standard HDDs, such as with sequential writes which a user may wish to exploit.

The E-regions in SMR drives are generally used as a temporary staging area for data. The bulk of the device's storage space is allocated to the shingled I-regions. Typically new write data is temporarily written to an E-region and then a background storage management task is responsible for moving the data to a shingled I-region at an appropriate time. The background storage management task is also responsible for doing defragmentation-type data management. The E-regions are sometimes referred to as E-caches in the literature.

The E-regions and I-regions are concentric circular bands of tracks that extend 360 degrees around the surface of the disk. All of the regions are magnetically formed/written as concentric tracks in generally homogeneous thin film magnetic material on the planar surfaces of the disk.

Various standard command sets have been defined in the prior art for computers to communicate with and control storage devices. Commercial storage devices typically implement commands in addition to the minimum required set for a particular standard. One set of commands is included in the Small Computer System Interface (SCSI), which is a set of standards for physically connecting to and transferring information between computers and peripheral devices. The SCSI standards define commands, protocols, and electrical and optical interfaces. Another standard command set is ATA (also known as IDE). One command in the SCSI standard is SYNCHRONIZE CACHE, which is used to cause the cached write data in RAM to be written to non-volatile disk media.

SUMMARY OF THE INVENTION

Shingled magnetic recording (SMR) devices according to embodiments of the invention include a command processor for accepting commands from the host/user for executing selected SMR related operations, setting selected SMR parameters and reading selected SMR related statistics and status indicators. The commands allow a host/user to control defragmentation and destaging operations. Embodiments include some or all of the set of features allowing selection of formatting settings, selection of optimization settings; command to immediately run defragmentation operation; command to change waiting time before starting defragmentation operation; and command to temporarily suspend defragmentation operation until certain usage threshold is met (e.g., E-region(s) near full).

BRIEF DESCRIPTION OF THE FIGURES

FIG. 1 is an illustration of an SMR data storage device with a command processor according to an embodiment of the invention.

DETAILED DESCRIPTION OF THE INVENTION

FIG. 1 is an illustration of a data storage device (DSD) 10 using SMR with an command processor 21 according to an embodiment of the invention. The command processor 21 functions according to the prior art except as described herein, and aspects of the system that perform prior art functions are not shown. The host/user 11 can be any type of computer and can communicate with the device by any means including through a network. The term "user" will be used interchangeably with "host." Multiple hosts can also communicate with the device using prior art techniques. Thin films 12 are magnetic thin film coatings, which typically are deposited on both upper and lower surfaces of a hard disk (not shown) and a device can also have multiple disks. The films 12 are shown in FIG. 1 in cross section view. In a plan view, the regions are a plurality of concentric circular bands. The magnetic thin films are formatted for use in an SMR architecture and in this embodiment include E-region 16, I-regions 13 (also called I-track regions), write cache regions 14 (also called write-twice cache regions), and guard regions or bands 15. A device can have multiple E-regions. Non-volatile flash memory 19 is for storage of SMR parameter settings and/or SMR status/statistics in this embodiment, but any type of non-volatile storage can be used including the disk media.

The invention defines new commands that the host can send to the device in addition to standard commands that include read and write commands that reference standard logical block addresses (LBAs). In a typical SMR drive architecture an LBA for user data can be assigned to an E-region or to an I-region. In addition, the use of on-disk write cache regions, which are further described below, allows user data to be stored in these regions as well. An SMR device must maintain indirection tables that map LBAs used in host commands to the actual physical location typically called a PBA. The amount of memory required for the indirection table(s) is one of the pieces of information that can be read by the user in embodiments of the invention.

SMR command processor 21 accepts and responds to commands from the host/user according to the invention that include selected SMR command execution, SMR parameter setting and reading SMR status and statistics. Embodiments include some or all of the set of features allowing:

Control over selected SMR parameters;
Selection of available pre-loaded initial formatting settings (can delete old user-data if any);
Selection of available pre-loaded optimization settings (without altering user-data);
Command/Instruction to run defragmentation operation including on E-regions immediately instead of waiting for the device to decide when defragmentation operation should be performed;
Command/Instruction to change time-out duration from last command before starting defragmentation operation;
Command/Instruction to delay defragmentation operation until told otherwise or certain usage threshold met (e.g., E-region near full).

Embodiments can also include SMR status/statistical access for users for:

accessing status/statistical data through expanded SMART command.
accessing through WD/encapsulated command interface.
instruction to run data collection subroutine and store results.

The commands described below reference write-twice cache regions 14 in an SMR drive, although the invention can be implemented in SMR drives that do not include write-twice cache regions. Write-twice cache regions for an SMR drive are described in a commonly assigned co-pending application described in the Related Application Section above. Briefly, the unshingled write-twice cache regions are organized in concentric bands that are spaced at selected radial positions on the disk media between bands of shingled recording regions (I-regions) where most user data is stored. The locations for the unshingled write-twice cache regions can be predetermined, but in alternative embodiments write cache regions can be dynamically created to improve performance under certain conditions, for example, to take advantage of otherwise free or unused space on the device.

The categories of response capabilities for devices according to embodiments of the invention include ones that provide information (Status & Statistics) to the user, ones that perform Special Command functions and ones that set parameters that affect the operation of the device.

Parameters for the format command are only used for formatting, which invalidates all existing customer data. Parameters for the format command in embodiments of the invention include all or some of the following:

E-region size
E-region format choice
Write-Twice cache size
Number of WTC regions
WTC format choice Target user capacity (this could override some of the choices above to guarantee capacity)

I-region size

I-region configuration choice, i.e. choose between a number of preconfigured layout options for the I-regions.

DVR mode (flag/bit to indicate a special format for stream writing devices)

DVR mode system area (portion of the disk to be treated as non-streaming). Could take the form of start/end LBA or size and location(OD, MD, ID).

User writable Destaging/Defragmentation parameters affect the operation of the device. In embodiments of the invention some or all of the following set of parameters can be changed by user commands:

Destaging Threshold: Number of write-twice commands committed prior to destaging of the write cache buffer in RAM. Value=number. Alternatively this parameter could be measured in MB or GB of data. Note that this parameter refers to recent host write commands for which completed status has been sent, that are currently held in the write cache RAM data buffer. If write caching is disabled, they have already been written into a write-twice cache track.

Defragmentation Threshold: Number of exceptions per I-region before starting the defragmentation process. Value=number. Note that this threshold could apply to the number of exceptions in an I-region or to the amount of E-region space available, e.g. percent full or capacity available. Alternative embodiments could include various threshold parameters that trigger different aspects of defragmentation operations. The general concept is to provide the user a way to adjust the triggers for defragmentation operations.

I-region Size: LBAs or tracks per I-region. Value=number.

E-region Size: LBAs or tracks per E-region. Value=number

I-region Format Choice: Selection among available pre-set I-region schemes, such as selection of scheme optimized for sequential writes or another scheme optimized for random writes or third scheme optimized for lower power consumption. Value=number.

E-region Format Choice: Selection among available pre-set E-region schemes. Value=number.

Write-Twice Format Choice: Selection among available pre-set write-twice schemes. Value=number.

Timeout for Destaging Operation: Wait time after last command received from host before starting write-twice cache destaging operation. Value=number (ms).

Timeout for Defragmentation: Wait time after last command before starting defragmentation operation on I-region. Value=number (ms).

Higher ECC Protection Mode: Yes/no flag; extra ECC protection for I-tracks. Value=bit.

In embodiments of the invention some or all of the following Special Commands are available as user commands:

Start Destaging Operation: An override command to force start of destaging operation on the write cache buffer in RAM.

Start Defragmentation Operation: Override command to commence defragmentation operation. Defragmentation operation usually refers to I-regions, but a comparable compacting process is performed in E-regions, and is considered a part of the defragmentation process herein.

Suspend Defragmentation Operation: Override command to suspend defragmentation operation. Applies to defragmentation operations in E-regions as well as I-regions Parameter Reset: Override command to reset all parameters to factory default settings.

In embodiments of the invention some or all of the following Status & Statistics are readable by user commands:

E-region Summary: Size, total number, locations (summary of parameter settings). Value=text log.

I-Region Summary: Size, total number, locations (summary of parameter settings). Value=text log Write-Twice Cache Status: Cache blocks in use, percent full for each, etc. Value=text log.

Defragmentation Log for I-Regions: Includes defragmentation rate, time needed for each defragmentation operation, number of interruptions before completion, fragmentation level. Value=text log.

Drive Performance: Input/output speed log. Value=text log.

Full Parameter Summary: Summary of all parameter settings for SMR HDD. Value=text log.

Data Mixture: Amount of sequential writes versus random writes. Value=percent/fraction.

Estimated Time for Defragmentation: Estimated time needed for defragmentation of each I-region. Value=milliseconds.

Fragmentation Level: fragmentation of each I-region. Value=percent/fraction.

Transfer Length: Statistics on transfer length during drive activity. Value=log.

Parameter Readout: Readout of current value of all current parameter settings. Value=log.

Indirection Memory Size: Bytes of metadata needed for indirection memory. Value=number (bytes).

Duty Cycle Data: Duty cycle statistics for drive. Value=log.

Write Performance: Write performance statistics. Value=log.

Write Amplification: statistics on number of end-user writes to destaging/defragmentation writes for indirection system management. Value=text log or fraction.

Reread Rate: Reread statistics. Value=log.

Data Sectors per Track: Number of data sectors per track in I-regions. Value=log.

The invention claimed is:

1. A storage device using magnetic recording disks comprising:

a plurality of concentric shingled data I-regions in magnetic thin films on a disk surface in which each shingled data I-region includes a set of partially overlapping data tracks that are written in sequence one after another;

an E-region including a plurality of tracks in magnetic thin films on the disk surface, the E-region containing data being staged prior to being written to an I-region; and a command processor that executes commands from a host that include:

a command to start defragmentation operation;

a command to stop defragmentation operation;

a command to set a defrag threshold parameter for a number of exceptions per I-region before the device initiates defragmentation operation; and a command to read a current size for the E-region.

2. The storage device of claim 1 wherein the commands executed by the command processor include a command to set a waiting time after a last command is received from the host before the device initiates defragmentation operation.

3. The storage device of claim 1 wherein the commands executed by the command processor include a command to temporarily suspend defragmentation operation until the E-region usage exceeds a selected threshold.

4. The storage device of claim 1 further comprising write-twice cache regions on the disk surface and wherein the commands executed by the command processor include a command to start write-twice cache destaging operation.

5. The storage device of claim 1 further comprising write-twice cache regions on the disk surface and wherein the commands executed by the command processor include a command to set a wait time after a last command is received from the host before starting write-twice cache destaging operation.

6. The storage device of claim 1 further comprising write-twice cache regions on the disk surface and wherein the commands executed by the command processor include a command to read information indicating which write-twice cache blocks are in use.

7. The storage device of claim 1 further comprising write-twice cache regions on the disk surface and wherein the commands executed by the command processor include a command to read information indicating how full each write-twice cache block is.

8. The storage device of claim 1 wherein the commands executed by the command processor include a command to read information that includes an amount of memory required for one or more indirection tables used by the device.

9. The storage device of claim 1 wherein the commands executed by the command processor include a command to read statistics that include a fragmentation level for an I-region.

10. The storage device of claim 1 wherein the commands executed by the command processor include a command to read statistics that include a percentage of sequential writes versus random writes executed by the device.

11. The storage device of claim 1 wherein the commands executed by the command processor include a command to set a number of logical block addresses (LBAs) per I-region during a format operation.

12. The storage device of claim 1 wherein the commands executed by the command processor include a command to set a number of LBAs per E-region during a format operation.

13. The storage device of claim 1 wherein the commands executed by the command processor include a command to set a streaming mode during formatting to implement a selected format for write streaming devices.

14. The storage device of claim 1 wherein the commands executed by the command processor include a command to define a streaming mode system area during formatting which will be used for non-streaming writes.

15. A storage device using magnetic recording disks comprising:
a plurality of concentric shingled data I-regions in magnetic thin films on a disk surface in which each shingled data I-region includes a set of partially overlapping data tracks that are written in sequence one after another;
an E-region including a plurality of tracks in magnetic thin films on the disk surface, the E-region containing data being staged prior to being written to an I-region; and
a command processor that executes commands from a host that include:
a command to start defragmentation operation;
a command to stop defragmentation operation; and
a command to set a waiting time after a last command is received from the host before the device initiates defragmentation operation.

16. The storage device of claim 15 wherein the commands executed by the command processor include a command to set a streaming mode during formatting to implement a selected format for write streaming devices.

17. The storage device of claim 15 wherein the commands executed by the command processor include a command to define a streaming mode system area during formatting which will be used for non-streaming writes.

18. A storage device using magnetic recording disks comprising:
a plurality of concentric shingled data I-regions in magnetic thin films on a disk surface in which each shingled data I-region includes a set of partially overlapping data tracks that are written in sequence one after another;
an E-region including a plurality of tracks in magnetic thin films on the disk surface, the E-region containing data being staged prior to being written to an I-region; and
a command processor that executes commands from a host that include:
a command to set a number of LBAs per I-region during a format operation; and
a command to set a number of LBAs per E-region during a format operation.

19. The storage device of claim 18 wherein the commands executed by the command processor include a command to read information that includes an amount of memory required for one or more indirection tables used by the device.

20. The storage device of claim 18 wherein the commands executed by the command processor include a command to read statistics that include a fragmentation level for an I-region.

* * * * *